Sept. 19, 1950 R. N. ROWE 2,522,964
HINGED CLOSURE AND FASTENER THEREFOR
Filed Oct. 3, 1945
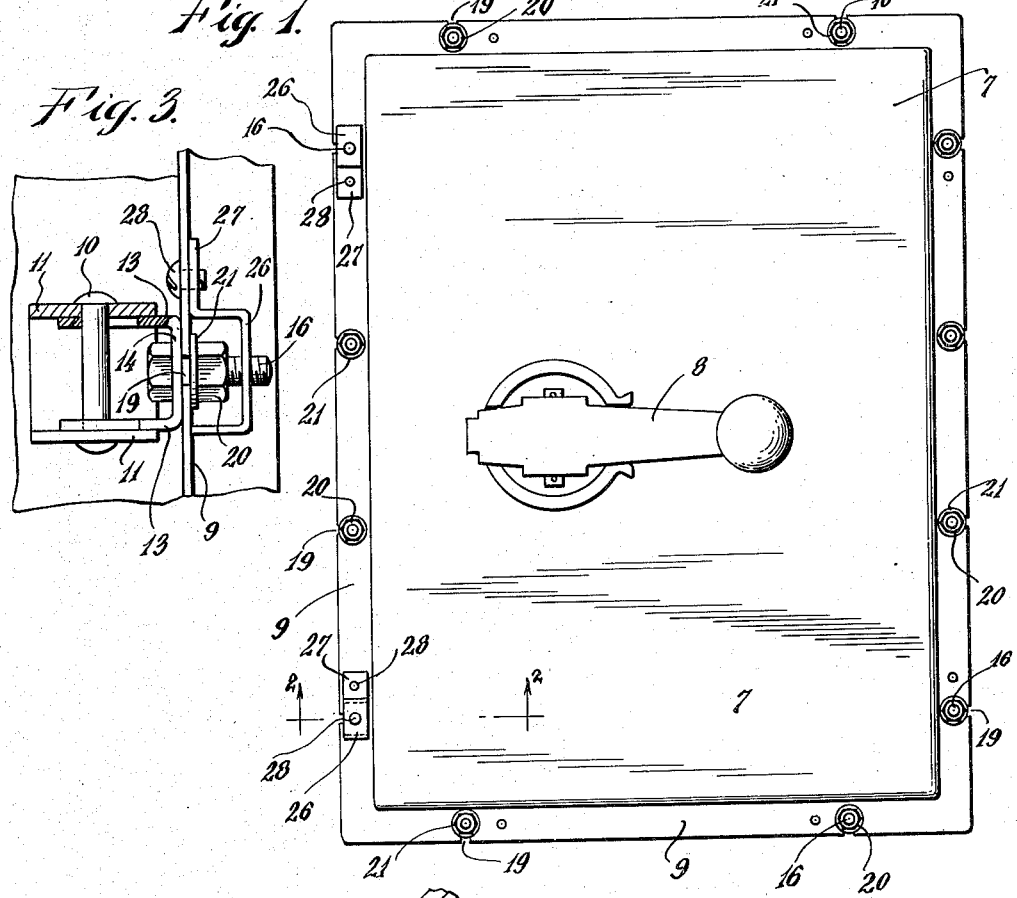
INVENTOR
Raymond N. Rowe
BY
ATTORNEY Patented Sept. 19, 1950

2,522,964

UNITED STATES PATENT OFFICE 2,522,964

HINGED CLOSURE AND FASTENER THEREFOR

Raymond N. Rowe, Plainville, Conn., assignor to The Trumbull Electric Manufacturing Company, Plainville, Conn., a corporation of Connecticut Application October 3, 1945, Serial No. 619,998

5 Claims. (Cl. 220—32)

My invention relates particularly to enclosed electrical apparatus such as switches, relays, protective devices etc.

In a heavy duty switch, the cover carries the actuating mechanism which can be operated when the cover is closed. The improvements involve novel hinging and clamping means for the cover by means of which the cover can be readily attached to or detached from the box. In such apparatus, it is necessary to clamp the cover tightly to the box body at all four edges. According to my invention any of the clamps can serve as hinges, that is, the cover can be hinged to any of the four edges of the box. Thus the clamps can serve not only as such but when desired the same clamps serve as hinges. It is thus possible to install the apparatus in any place desired and arrange the cover to open from any one of the four edges, whichever is most convenient.

I also prefer to lock the clamps which have been selected as the hinges so that they will not be tampered with when releasing the other clamps in order to open the box.

Fig. 1 is a front view of one form of apparatus, such as a switch box, embodying my invention, showing clamp bolts at all four sides of the cover, those at the left also constituting hinge members.

Fig. 2 is a cross section of one edge showing the hinge members in the closed cover position and in dotted lines in the open position.

Fig. 3 is a side view of a fragment of the cover with one of the hinge members and its shield or locking device, parts being shown in section.

The box 6 of metal contains the switch mechanism (not shown). The cover 7 in this case carries the operating handle 8. The cover has a flange 9 which must be secured to the box along each edge by a series of clamps. Each clamp is hinged to a bracket having a pivot 10 which is carried by the flanges 11, 11. These flanges project from a base 12 which is secured to the box for instance by welding. Each clamp has a yoke with side arms 13 and a cross bar 14. Each arm has an elongated hole 15 through which the pivot 10 passes. A bolt 16 has a head 17 held within the yoke and passes through a hole 18 in the cross bar 14.

The flange 9 of the cover has openings, preferably notches 19 in its four edges to accommodate the clamp bolts 16. A nut 20 is adjustable on each bolt to clamp the flange down against the cross bar 14 of the yoke. A washer 21 may also be used. In order to insure a tight seal between the cover and the box I provide a resilient gasket 22 which is held in a groove alongside the angle piece 23. When the clamps are tightened the cover is drawn down until the edges 24 are pressed into the gasket.

The U-shaped member or yoke comprising the arms 13 and cross bar 14 is preferably so dimensioned that it is possible to get only a fixed amount of compression of the gasket. In other words, when the flange 9 of the cover is tightened down to the surface of the cross-piece 14, further tightening of the nut will not tighten the gasket but will simply grip the flange under the nut more tightly. The device is arranged in this way so as to prevent overstressing of the cover. The gasket is selected for only a limited amount of compression.

The inside of the box is reinforced by ribs 25 around the area to which the clamp brackets are mounted. These clamps are so constructed that they may serve as hinges if the clamps around three sides are released. The construction shown has shields 26 secured over two of the clamps along the left hand edge of the cover so that the nuts cannot be loosened. Each shield has a foot 27 secured to the flange 9 by a screw 28 inserted from beneath the flange. In order for these clamps to function satisfactorily, the flange 9 should be drawn tight against the cross bars 14 of the yokes. By making the holes 15 somewhat larger than the diameter of the pivots allowance is provided for slight irregularities in manufacture.

The shields serve to indicate to the inspector which clamps are intended to serve as hinges. To open the box, the clamps along the edges which are not shielded are released. As all of the clamps are alike, it is obvious that the cover may be hinged along any one of its edges depending upon the convenience of the installation.

Preferably the openings 19 in the flange 9 are in the form of notches open at the edges so that the clamps may be released without the necessity of removing the nuts 20 and bolt 16 when preparing to open the cover.

I claim:

1. A rectangular receptacle comprising a body having side walls with edges around the space within the receptacle, stationary brackets secured to all of the outer walls of the body a short distance from the edges, a hinge pin in each bracket, a cover having a resilient gasket engaging the edges of the body when the cover is closed, said cover having flanges extending outwardly above said brackets, a U-shaped yoke having side arms with elongated slots mounted on each hinge pin, a clamp bolt extending through each yoke and a notch in the flange of the cover alined therewith, each bolt having its head positioned between the side arms of a yoke and a nut screwed on to the upper end of each bolt for drawing said flanges and said yokes together and forcing the gasket to be impressed upon the edges of the body.

2. A rectangular receptacle comprising a body having side walls with edges around the space within the receptacle, stationary brackets secured to each outer wall of the body a short distance from its edge, a hinge pin in each bracket, a cover having a resilient gasket to engage the edges of the body when the cover is closed, said cover having a flange extending outwardly at each outer edge with notches opening outwardly above said brackets, a U-shaped yoke having side arms mounted on each hinge pin, a clamp bolt extending through each yoke and the notch in the flange of the cover alined therewith, said bolt having an integral head positioned between the side arms of the yoke and a nut screwed on to the upper end of each bolt and drawing said flanges and said yoke together and impressing said gasket upon the edges of the body.

3. A receptacle comprising a body having side walls with edges around the space within the receptacle, a number of stationary brackets secured to an outer wall of the body a short distance from one edge, a hinge pin in each bracket, a cover having a resilient gasket engaging the edges of the body when the cover is closed, said cover having a flange extending outwardly above said brackets, a U-shaped yoke having side arms with elongated slots mounted on each hinge pin, a clamp bolt extending through each yoke and an opening in the flange of the cover alined therewith, said bolt having a head positioned between the side arms of the yoke and a nut screwed on to the upper end of each bolt and drawing said flange and said yoke together, a guard extending over a nut and attached directly to said flange independently of said bolt and means for drawing the gasket of the cover to a seat against the corresponding edges of the body.

4. A receptacle comprising a box body having side walls and a cover having a flange extending outwardly over one wall, U-shaped brackets secured to the outer surfaces of said walls, each bracket having spaced arms projecting outwardly from said side wall and having a hinge pin supported by said arms, said flange having a slot registering with the spaces between the arms of each bracket, a U-shaped yoke having a cross piece and side arms hinged on each hinge pin, each arm of a yoke having an elongated slot for its pin, a bolt carried by each yoke and having a screw-threaded shank extending through a slot in the edge of the cover flange and a nut threaded on each bolt for clamping said cover flange against the cross piece of the respective yoke.

5. A receptacle as set forth in claim 4 having a shield mounted on said flange and surrounding at least one of said bolts and a screw inserted from beneath said flange holding said shield in place.

RAYMOND N. ROWE.

REFERENCES CITED

The following references are of record in the file of this patent:

UNITED STATES PATENTS

| Number | Name | Date |
|---|---|---|
| 1,306,347 | Krantz | June 10, 1919 |
| 1,337,733 | Sweetland et al. | Apr. 20, 1920 |
| 1,412,466 | Freeman | Apr. 11, 1922 |
| 1,417,723 | Eidlitz | May 30, 1922 |
| 1,469,070 | Jacobs | Sept. 25, 1923 |
| 1,793,946 | McEwan | Feb. 24, 1932 |
| 2,260,025 | Hepperlen | Oct. 21, 1941 |
| 2,274,014 | Tinnerman | Feb. 24, 1942 |
| 2,359,054 | Schonitzer et al. | Sept. 26, 1944 |
| 2,371,194 | Socke et al. | Mar. 13, 1945 |

FOREIGN PATENTS

| Number | Country | Date |
|---|---|---|
| 13,368 | Great Britain | A. D. 1905 |
| 140,262 | Great Britain | A. D. 1920 |
| 214,346 | Great Britain | Apr. 24, 1924 |